United States Patent [19]
Accountius

[11] 3,719,452
[45] March 6, 1973

[54] CARBONACEOUS MATERIAL AND METHOD OF PREPARATION

[75] Inventor: Oliver E. Accountius, Tarzana, Calif.

[73] Assignee: North American Rockwell Corporation

[22] Filed: Dec. 1, 1969

[21] Appl. No.: 881,293

Related U.S. Application Data

[63] Continuation of Ser. No. 429,315, Aug. 1, 1965, abandoned.

[52] U.S. Cl..............423/449, 23/208, 23/209.1, 23/209.4, 106/56, 264/29
[51] Int. Cl.....C01b 31/02, C01b 31/04, C01b 31/36
[58] Field of Search..............23/309.1, 209.2, 209.4; 264/29

[56] References Cited

UNITED STATES PATENTS

| | | |
|---|---|---|
| 3,109,712 | 11/1963 | Bedfern.........................23/209.2 |
| 2,697,028 | 12/1954 | Baker et al.....................23/209.1 |
| 2,915,370 | 12/1959 | Mitchell........................23/209.1 |

OTHER PUBLICATIONS

Palin "Nature" No. 4537, Oct. 13, 1956, pages 809–810.

Kovacic et al. "J. American Chemical Soc." Vol. 85, 1963, pages 454–458

*Primary Examiner*—Edward J. Meros
*Attorney*—L. Lee Humphries, Thomas S. MacDonald and D. Douglas Price

[57] ABSTRACT

A relatively pure carbonaceous material formed by compacting polyphenylene and pyrolyzing the compacted matter. The polyphenylene can be mixed with filler material to produce heterogeneous carbonaceous structures. If the filler is silicon in a stoichiometric ratio to the carbon, silicon carbide is produced by the pyrolization.

6 Claims, No Drawings

CARBONACEOUS MATERIAL AND METHOD OF PREPARATION

CROSS REFERENCE TO RELATED APPLICATION

This application is a continuation of my co-pending application Ser. No. 492,315, filed Oct. 1, 1965, now abandoned.

This invention relates to new compounds and their method of preparation. More particularly, the invention relates to carbonized products formed from intractable polymeric structures comprised of benzene rings.

Prior to the herein invention, polyaromatic compounds wherein the benzene rings all are directly connected were generally thought to be intractable. That is, these compounds were not believed to be susceptible of practical utilization since they could not be formed into useable products. The term intractable with relation to polymeric materials indicates that the substance formed cannot be melted, dissolved in a solvent, or treated in any conventional way so that molding and shaping could transpire from the basic powder which would be formed from the reaction to make the material. Examples of the polyaromatics concerned would be polytoluene, polynapthylene, and polyphenylene. Additionally, the benzene rings in the structures can have substitutions thereon, such as halogen atoms, including chlorine and the like.

It has been found, however, that when the polyaromatic compounds which are normally in the form of a powder as formed, are compacted in a press under pressure, a coherent mass can be obtained. This compacted mass, in accordance with this invention, is then subjected to high temperatures in a furnace whereby the material is pyrolyzed. The pyrolyzed material has new and unusual properties and is a new composition of matter.

Prior to the herein invention it has been known to pyrolyze various polymeric materials. However, the products resultant from such pyrolyzation differ substantially from that obtained herein. Firstly, it is to be noted that the invention is concerned with polyaromatic compounds. Particularly, the invention pertains to polymers where the linkage is from ring to ring in the polymer chain. Upon compaction, it is believed that the benzene rings comprising the structure align themselves in an orderly pattern so as to present a crystalline-like substance. This cannot be attained with non-aromatic polymers, nor with aromatic polymers where compaction does not transpire. Upon the pyrolysis of the compacted polyaromatic compounds, the new products of the invention are obtained which have chemical properties similar to graphite. However, the material is harder than graphite and possesses other distinguishing characteristics as will be shown. The resultant pyrolyzed products are layered structures which, as indicated, is obtained through the initial compaction of the benzene rings.

The material of the invention can be used wherever graphite is normally used, such as electrodes, rocket engine throat inserts, rocket engine nozzles, brush stock, and projector carbon, just to mention a few. Of equal or greater significance is the fact that through the process of the herein invention one can incorporate filler material using the pyrolyzed polymers of the invention as a binder therefor. Thus, oxidation-resistant carbon-base bodies can be formed by compacting the polymer prior to pyrolyzation with additives such as metallic borides, carbides, and nitrides which oxidize at elevated temperatures to give an oxidizing resistant coating. The pyrolyzed material can be strengthened by pressing metallic, ceramic, and various polymeric fibers and the like in the matrix prior to pyrolysis. Due to the initial pressing operation, products of various sizes and shapes can be molded. For example, carbon base chemical resistant structural materials such as pipe, bricks, and the like can be formed by molding, pressing, or extruding mixtures of powder, carbon, or graphite, with the polymers of the invention with subsequent pyrolysis. Other possibilities lie in the field of formation of silicon carbide bodies formed by compacting powdered silicon with the polymers in the proper proportions so that at carburization temperatures the body is converted to silicon carbide. It is believed all the prior uses will be better understood from the following detailed description of the invention and the specific examples set forth.

In describing the invention in more detail, the polymer parapolyphenylene wherein the phenylene rings are connected to each other through the para-carbon atom, will be used as illustrative of the intractable polymeric materials which form the carbonaceous material of this invention. The material and its method of manufacture is well known, as described in the paper presented by Peter Kovacic and Alexander Kyriakis in the *Journal of the American Chemical Society*, 85, 454 (1963). The polymer obtained according to the process described in the paper is infusible, consisting of the benzene rings linked through the para positions. It contains only carbon-hydrogen in the weight ratio of 18:1. In addition to being infusible, the polymer is chemically inert with a high degree of thermal stability. Thus, this material is termed intractable. The polymer as obtained from the process of its manufacture is a fluffy brown powder having a very high surface area. The polymers of the invention are pressed at pressures of at least 1,000 psi. Pressures as high as 120,000 psi have been utilized. It is obvious that the pressure utilized for the pressing of the powder will affect the denseness of the final compacted mass. However, it is to be pointed out that solid coherent masses capable of being pyrolyzed are obtainable over the entire range stated. For various given applications more compacted masses or in other words higher pressures become desirable. The pressing can transpire by utilization of any conventional techniques involving mechanical or isostatic methods which in themselves form no part of the invention. The compaction can transpire at room temperature and gives a strong dense body over the given ranges. Alternatively, pressing can occur at elevated temperatures. Compacted material has considerable lubricity so that the mold release is quite easy. The parapolyphenylene, for example, in the pressed green state exhibits a strength of up to 2,000 psi. Additionally, the x-ray diffraction studies show a high degree of anisotropy.

The compacted powder is then placed in a furnace whereby the compact mass is pyrolyzed. During pyrolysis the hydrogen and other atoms than the carbon present in the structure are driven off as volatiles, leaving a relatively pure carbonaceous mass. The material is left at the temperature for time sufficient for pyrolysis of the entire mass to occur. Pyrolysis temperatures can vary in the range of 650° to 2500°C. The soak or residence time of the compacted mass in the temperature environment will vary according to the temperature. However, for practical purposes it has been found that a residence time of 1 hour in the temperature ranges set forth is sufficient for pyrolysis to occur.

EXAMPLE I 1.68 grams of para-polyphenylene polymer was placed in a two-punch steel die. The material was molded in a press at a pressure of 33,500 psi. The resultant specimen was a bar 2.35 × 0.31 × 0.11 in. The compacted bar was then placed in a ceramic tube furnace which was heated by electrical resistance. The temperature of the furnace was 1,000°C. The residence time of the bar in argon atmosphere within the furnace was one hour. Upon removal from the furnace the bar was inspected and determined to have been completely pyrolyzed.

EXAMPLE II

The above procedure was repeated utilizing 0.48 g of para-polyphenylene. The pressing pressure was 122,000 psi. Instead of the bar being formed, a cylinder having the dimensions of 0.5 in. dia. × 0.12 in. in length was made in accordance with the mold used in the pressing apparatus. The firing temperature was 1,000°C with a residence time of one hour in the furnace; this sample was also maintained in an argon atmosphere. The pyrolyzed parapolyphenylene carbonaceous product of the invention was obtained.

EXAMPLE III

The process of Example II was repeated forming the same size cylinder using the same amount of polymer. However, in this example a pressing pressure of 10,000 psi was utilized. Once again a carbonaceous product of the invention was obtained.

EXAMPLE IV

To illustrate the utilization of the products of the invention, the bar made from Example I was used in a dry cell battery. A commercial D-size flashlight dry cell battery, having a 1½ volt rating, was utilized. The carbon electrode in the dry cell was removed and replaced with the bar from Example I. The battery was then tested using a voltmeter, and the 1½ volt output was maintained.

EXAMPLE V

To determine the effect of the pyrolysis temperature upon the modulus of rupture, four samples were prepared in accordance with the procedures set forth in Example I. Following in Table I are the results of the preparation of the samples in that modulus of rupture. The rupture test performed was a three-point loading test. It will be noticed that the modulus is proportional to the firing temperature. In all instances it should be pointed out that the residence time of the material at the pyrolysis temperature was 1 hour.

TABLE I

| Weight (gms) | Pressing (psi) | Specimen Size in. | Firing Temp.°C | Modulus of rupture test (psi) |
|---|---|---|---|---|
| 1.75 | 33,500 | 2.35×0.31×0.12(bar) | 1000 | 6,200 |
| 1.47 | 33,500 | 2.35×0.31×0.10(bar) | 870 | 4,400 |
| 1.67 | 33,500 | 2.35×0.31×0.11(bar) | 760 | 3,300 |
| 1.56 | 33,500 | 2.35×0.31×0.11(bar) | 650 | 2,500 |

The carbonaceous product which resulted from the pyrolysis of the compacted polyphenylene material in the above examples was analyzed by optical microscopy and x-ray diffraction techniques. Optical microscopy demonstrates that the pyrolyzed product has a layered structure, these layers being made up of carbonaceous material, so that the thermal and electrical conductivities of the pyrolyzed material are anisotropic. The structure of the carbonaceous material within the layers may be varied by the choice of processing conditions. For example, a microstructure very closely resembling graphite, Table II, was obtained by pressing the polyphenylene at 80,000 psi and heating to 1,000°C for 1 hour in argon. On the other hand, pressing at 10,000 psi and heating to 1,000°C, Table II, yielded a structure which deviated from that of graphite. To one skilled in the art, it is obvious that by proper selection of processing conditions, a graphite product can be obtained made up of layers of graphite at temperatures significantly lower than normal graphitization temperatures or a product which has anisotropic electrical and thermal properties, as ordinarily associated with graphite, can be obtained made up of layers of carbon and which has the concomitant advantages of carbon, e.g., high hardness and low temperature processability.

TABLE II

| | "d" spacings, A | | |
|---|---|---|---|
| Graphite | 1.68 | 2.04 | 3.37 |
| Pyrolyzed polyphenylene (80,000 psi, 1000°C) | 1.69 | 2.12 | 3.39 |
| Pyrolyzed polyphenylene (10,000 psi, 1000°C) | 1.21 | 2.10 | 3.41 |

One of the outstanding advantages of the herein material and method of manufacture as compared to conventional graphite materials is that the carbonaceous composition of the invention can incorporate other materials therein. In other words, the pyrolyzed polymers of the invention can serve as binders for various other materials. As previously indicated, practically any material which is not affected by the pyrolysis temperature can be incorporated within the polymer mass during the compacting operation. Furthermore, the almost complete retention of the carbon present in the polyphenylene gives an unusually high percentage yield of carbonaceous residue for a carbonizing binder. The yield of carbonized residue ranges between 84.94 and 87.18 percent. Binders in general use seldom exceed a 65 percent yield of carbon on carbonization. Also, since the polyphenylene does not melt or soften as the temperature is increased to the point where pyrolysis is complete, bodies made with polyphenylene as the binder do not soften, deform or warp appreciably from the geometric shape in which they were originally pressed removing the necessity for packing in coke or otherwise supporting the body during the pyrolysis process. As can be appreciated, the material incorporated would be mixed with the powdered polymer prior to compaction, resulting in a homogenous mixture which will then be subjected to the pyrolysis. As previously indicated, the fillers used in such a composite would range from metallic borides, carbides, and nitrides to metallic, ceramic and boron powders and fibers as well as powdered carbon or graphite. Following are some specific examples of composites formed utilizing the product of the invention.

EXAMPLE VI

A mixture was made of two grams of ATJ graphite passing through a 270 mesh, 0.1 grams of boron powder passing through a 325 mesh, and 0.2 grams of the para-polyphenylene. After thorough mixing of the ingredients a cylinder was pressed having dimensions of 0.5 in. in diameter by 0.12 in. in length, having a weight of 1.40 grams. The pressing pressure was 50,000 psi. The compacted mass was then placed in a furnace and fired at 1,000°C for one-half hour. A dense consolidated body was achieved.

EXAMPLE VII

A mixture was made of 2.25 grams of zirconium boride in the form of 325F powder; 0.5 gram silicon carbide of 600 grit and 2.11 grams of the para-polyphenylene. The pressing pressure utilized to compact the mixture was 100,000 psi. An 0.5 in. diameter by 0.2 in. length cylinder was formed, having a weight of 1.71 grams. The compacted cylinder was placed in an oven and heated at 1,000°C for 1 hour. The final pyrolyzed product was then subjected to an oxyacetylene torch and indicated excellent oxidation resistance.

EXAMPLE VIII

A mixture of 4 grams of ATJ graphite having a −270 mesh, 0.75 gram of iridium powder having a −80 mesh, and 1.2 grams of para-polyphenylene were mixed. The mixture formed was subjected to a pressing pressure of 100,000 psi to form a cylinder having the 0.5 in. diameter and 1.3 in. length. The cylinder weighed 0.83 gram. The compacted mass was placed in an oven and heated at 1,000°C for 1 hour. The same steps and components were used to form another example utilizing, however, a heating temperature in the oven of 2,400°C for 1 hour. Both of the samples formed indicated oxidation resistance in the presence of an oxyacetylene torch.

EXAMPLE IX

A mixture of 0.75 gram ATJ graphite powder passing through a 270 mesh screen, 0.005 gram of 5 mil diameter boron fibers chopped to one-fourth to one-eighth in. lengths and an 0.2 gram of polyphenylene powder was pressed into an 0.5 in. diameter cylinder, 0.12 in. high and weighing 0.66 gram. This was heated to 1000°C for one hour in an argon atmosphere. Consolidation was achieved to a hard compact fiber-reinforced body. No distinctive physical or chemical interaction between the boron fibers and the pyrolytic residue or volatile products was evident.

A mixture of 0.75 gram ATJ graphite powder passing through a 270 mesh screen, 0.005 gram of 5 mil diameter boron fibers chopped to one-fourth to one-eighth in. lengths and an 0.2 gram of polyphenylene powder was pressed into an 0.5 in. diameter cylinder, 0.12 in. high and weighing 0.66 gram. This was heated to 1000°C for one hour in an argon atmosphere. Consolidation was achieved to a hard compact fiber-reinforced body. No distinctive physical or chemical interaction between the boron fibers and the pyrolytic residue or volatile products was evident.

As can be seen from the previous examples, composite materials can be prepared utilizing the pyrolyzed polyphenylene as a binder. It is pointed out that the amount of binder present will vary upon the desired end results as well as the filler material utilized. It has been shown in the examples that various small amounts of the polyphenylene can serve as a binder to form compacts of the invention. As little as two weight percent of the polyphenylene can be utilized to form composites.

It is obvious that the particle size of the particulated fillers on the diameters of reinforcing fibers will not have any significant effect on consolidation of these composites by pressing and heating as long as the amount of polyphenylene is sufficient to fill the void spaces between the particles or fibers. In addition, no problems in compatibility will exist between fillers or fibers and polyphenylene where the fillers or fibers have chemical compatibility with hydrogen and carbon up to the pyrolysis temperature. One of the promising fields of utilizing the invention is in the formation of compounds by actual chemical interaction of the pyrolyzed product with a filler material. This has been demonstrated wherein silicon has been incorporated into the powder prior to compaction. Upon firing, beta silicon carbide has been obtained. Following is a specific example indicating the formation of the silicon carbide.

EXAMPLE X 3.4 gram of silicon of -325 mesh and 2 grams of para-polyphenylene were thoroughly mixed. The mixture was subjected to a pressing pressure of 120,000 psi to form a cylinder 0.5 in. in diameter by 0.16 in. in length. The compacted cylinder weighed 0.87 gram. The cylinder was then subjected to a heating temperature of 1,400°C. The resultant product was beta silicon carbide as determined by x-ray diffraction techniques.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A process for preparing a relatively pure carbonaceous material comprising compacting particulate polyphenylene at a pressure of at least 1,000 psi to form a solid coherent mass and pyrolyzing the compacted polyphenylene mass in an inert atmosphere at a temperature in the range of 625° to 2500°C.

2. The process of claim 1 wherein the polyphenylene is compacted at a pressure between 1,000 and 120,000 psi.

3. The process of claim 1 wherein the compacted polyphenylene mass is pyrolyzed at a temperature between 1,000° and 2,500°C.

4. The process of claim 1 wherein the polyphenylene is substituted by halogen atoms.

5. The process of claim 1 wherein the polyphenylene is parapolyphenylene.

6. A carbonaceous material which is harder than graphite, anisotropic, and has a layered structure produced by the process of claim 1.

* * * * *